United States Patent
Park (10) Patent No.: US 10,480,203 B2
(45) Date of Patent: Nov. 19, 2019

(54) CONTAINER HOUSE HAVING REINFORCED INSULATION PROPERTY

(71) Applicant: UNITHOUSE CO., LTD., Gyeonggi-do (KR)

(72) Inventor: Oung Rea Park, Gyeonggi-do (KR)

(73) Assignee: UNITHOUSE CO., LTD., Gyeonggi-do (KR)

(*) Notice: Subject to any disclaimer, the term of this patent is extended or adjusted under 35 U.S.C. 154(b) by 166 days.

(21) Appl. No.: 15/111,179

(22) PCT Filed: Jul. 24, 2015

(86) PCT No.: PCT/KR2015/007742
§ 371 (c)(1),
(2) Date: Jul. 12, 2016

(87) PCT Pub. No.: WO2016/018007
PCT Pub. Date: Feb. 4, 2016

(65) Prior Publication Data
US 2017/0130475 A1 May 11, 2017

(30) Foreign Application Priority Data
Jul. 31, 2014 (KR) .................. 10-2014-0098429

(51) Int. Cl.
*F24F 13/26* (2006.01)
*E04B 1/348* (2006.01)
(Continued)

(52) U.S. Cl.
CPC ............... *E04H 1/02* (2013.01); *E04B 1/348* (2013.01); *E04B 1/80* (2013.01); *E04B 9/001* (2013.01);
(Continued)

(58) Field of Classification Search
CPC . E04H 1/02; E04B 1/348; E04B 9/001; E04B 1/80; E04C 2/292; E04F 13/0866; E04F 13/0875; E04F 13/12
(Continued)

(56) References Cited

U.S. PATENT DOCUMENTS 5,240,177 A * 8/1993 Muramatsu ............ G05D 22/02
236/44 C
5,317,857 A * 6/1994 Allison .................. E04H 1/1205
52/125.6
(Continued)

FOREIGN PATENT DOCUMENTS

KR 2001725900000 12/1999
KR 100671267 * 1/2007
(Continued)

*Primary Examiner* — Steven B McAllister
*Assistant Examiner* — Ko-Wei Lin
(74) *Attorney, Agent, or Firm* — IPLA P.A.; James E. Bame (57) ABSTRACT

A container house having a reinforced insulation property, comprising: a plurality of first spacing members (20) welded to a side wall (13) inside of a container body (10); a plurality of second spacing members (30) welded to a ceiling (14) inside of the container body (10); a plurality of first insulation panels (40) coupled to the first spacing members (20) so as to form a first interval space (D1) between the first insulation panels and the side wall (13); a plurality of second insulation panels (50) coupled to the second spacing members (30) so as to form a second interval space (D2) between the second insulation panels and the ceiling (14); and a plurality of finishing panels (60) attached to the surfaces of the first and second insulation panels (40,50).

17 Claims, 3 Drawing Sheets

(51) Int. Cl.
*E04H 1/02* (2006.01)
*F24F 11/30* (2018.01)
*F24F 11/77* (2018.01)
*E04B 1/80* (2006.01)
*E04B 9/00* (2006.01)
*E04C 2/292* (2006.01)
*E04F 13/08* (2006.01)
*E04F 13/12* (2006.01)
*F24F 7/013* (2006.01)
*F24F 110/12* (2018.01)
*F24F 110/10* (2018.01)
*F24F 7/00* (2006.01)

(52) U.S. Cl.
CPC .......... *E04C 2/292* (2013.01); *E04F 13/0866* (2013.01); *E04F 13/0875* (2013.01); *E04F 13/12* (2013.01); *F24F 7/013* (2013.01); *F24F 11/30* (2018.01); *F24F 11/77* (2018.01); *F24F 13/26* (2013.01); *F24F 2007/003* (2013.01); *F24F 2110/10* (2018.01); *F24F 2110/12* (2018.01); *F24F 2221/46* (2013.01); *F24F 2221/52* (2013.01)

(58) Field of Classification Search
USPC .................................. 454/239, 251, 253, 237
See application file for complete search history.

(56) References Cited

U.S. PATENT DOCUMENTS

| | | | | |
|---|---|---|---|---|
| 5,740,636 A | * | 4/1998 | Archard | ................ E04D 13/152 52/169.11 |
| 8,245,947 B2 | * | 8/2012 | Roderick | ............. F24F 11/0001 236/49.3 |
| 9,441,371 B1 | * | 9/2016 | Harkins | .................... E04C 3/02 |
| 2011/0000146 A1 | * | 1/2011 | Takeda | ................ A47C 29/003 52/79.1 |
| 2012/0140415 A1 | * | 6/2012 | Driggers | ................ G06F 1/183 361/692 |
| 2013/0180182 A1 | * | 7/2013 | Yoo | ........................ E04B 1/3483 52/6 |
| 2016/0160515 A1 | * | 6/2016 | Wallance | ............... E04B 1/3483 52/79.1 |

FOREIGN PATENT DOCUMENTS

| | | | |
|---|---|---|---|
| KR | 20090122156 | | 11/2009 |
| KR | 20100032617 | * | 3/2010 |
| KR | 20120075077 | * | 7/2012 |
| KR | 20130051674 | | 5/2013 |

* cited by examiner

CONTAINER HOUSE HAVING REINFORCED INSULATION PROPERTY

BACKGROUND

The present invention relates to a container house having the reinforced insulation property, and more particularly, to a container house having the reinforced insulation property which can implement a pleasant environment even in summer.

A container house is a prefabricated residential space having electric wirings therein and equipped with furniture for human habitation. Such a container house has insulation materials assembled and attached to the side wall in order to insulate the inside of the container from the outside. In this instance, the insulation materials are attached to the side wall through the steps of fixing a plurality of reinforcing bars to the side wall with pieces of iron or wires, cutting insulation materials, such as Styrofoam, inserting the insulation materials between the reinforcing bars, and fixing a plaster board to the reinforcing bars with nails or the likes. As a prior art, Korean Utility Model Registration No. 20-0172590 discloses a "laminated wall panel for container house".

However, such a container house has a disadvantage in that insulation is not good due to a gap or dislocation between the reinforcing bars.

Moreover, in order to secure a space for electric wirings to supply electricity, a groove is formed in the insulation material at the rear of the plaster board to form a space, and then, the electric wirings are fit into the groove. Therefore, if a spark is set off at the electric wirings due to electrical short, the Styrofoam insulation materials are burnt and a fire breaks out.

Furthermore, in summer, because temperature of the outer wall of the container house rises up to 70 to 80° C., high heat is transferred to the electric wirings as it is, and so, insulation layers surrounding the electric wirings are damaged or hardening is accelerated. Therefore, as time goes by, possibility of electrical short rises.

SUMMARY OF THE INVENTION

Accordingly, the present invention has been made in an effort to solve the above-mentioned problems occurring in the prior arts, and it is an object of the present invention to provide a container house having a reinforced insulation property which can maximize insulating effect by respectively installing first and second insulation panels on a side wall and a ceiling part to respectively form first and second interval spaces having air layers, and which can maintain a pleasant environment in summer or winter.

It is another object of the present invention to provide a container house having a reinforced insulation property which is easy to assemble because it does not need a space for installing electric wirings, and which there is no possibility of fire even though a spark is set off by electrical short.

It is a further object of the present invention to provide a container house having a reinforced insulation property which can prevent damage of insulation layers surrounding the electric wirings or acceleration of hardening because high heat is not transferred to the electric wirings even though temperature of the side wall and the ceiling part of the container house rises up to 70 to 80° C. in the middle of summer.

To achieve the above objects, the present invention provides a container house having a reinforced insulation property including: a plurality of first spacing members welded to a side wall inside a container body; a plurality of second spacing members welded to a ceiling part inside the container body; a plurality of first insulation panels coupled to the first spacing members so as to form a first interval space between the first insulation panels and the side wall; a plurality of second insulation panels coupled to the second spacing members so as to form a second interval space between the second insulation panels and the ceiling part; and a plurality of finishing panels attached to the surfaces of the first and second insulation panels.

In the present invention, the first and second insulation panels are sandwich panels which are formed in such a way that first and second iron plates are attached to both sides of first and second insulation materials made of Styrofoam in order to prevent generation of fire by a spark even though the park is generated from electric wirings passing the first and second interval spaces.

In the present invention, the container house further includes: a first inflow vent hole and a first outflow vent hole which are respectively formed at one side and the other side of the container body to communicate with the first interval space; and a fan unit communicating with the first outflow vent hole to form a negative pressure in the first interval spaces.

In the present invention, the container house further includes: a second inflow vent hole and a second outflow vent hole which are respectively formed at one side and the other side of the container body to communicate with the second interval space; and a fan unit communicating with the second outflow vent hole to form a negative pressure in the second interval spaces.

In the present invention, the fan unit includes: a fan housing surrounding the first outflow vent hole or the second outflow vent hole; and a fan which is mounted in the fan housing to discharge the inside air of the fan housing to the outside.

In the present invention, the container house further includes: a first temperature sensor for generating a first temperature signal corresponding to temperature of outdoor air measured; a second temperature sensor for generating a second temperature signal corresponding to inside temperature of at least one of the side wall and the ceiling part measured; and a fan operating part for operating the fan unit when a difference in temperatures measured by the first temperature signal S1 and the second temperature signal is over a preset temperature difference.

In the present invention, the container house further includes: a plurality of first vortex forming members which are formed inside the first interval space to form vortex so that the air passing through the first interval space flows in contact with the whole surface of the side wall.

In the present invention, the container house further includes: a plurality of second vortex forming members which are formed inside the second interval space to form vortex so that the air passing through the second interval space flows in contact with the whole surface of the ceiling part.

In the present invention, the container house further includes: a roof cover which surrounds the first inflow vent hole or the second inflow vent hole to prevent rain or snow from being induced into the first inflow vent hole or the second inflow vent hole and has a cover entrance formed below the first and second inflow vent holes to induce air.

DETAILED DESCRIPTION OF THE INVENTION

Hereinafter, reference will be now made in detail to a container house according to the preferred embodiments of the present invention with reference to the attached drawings.

Figure 1:
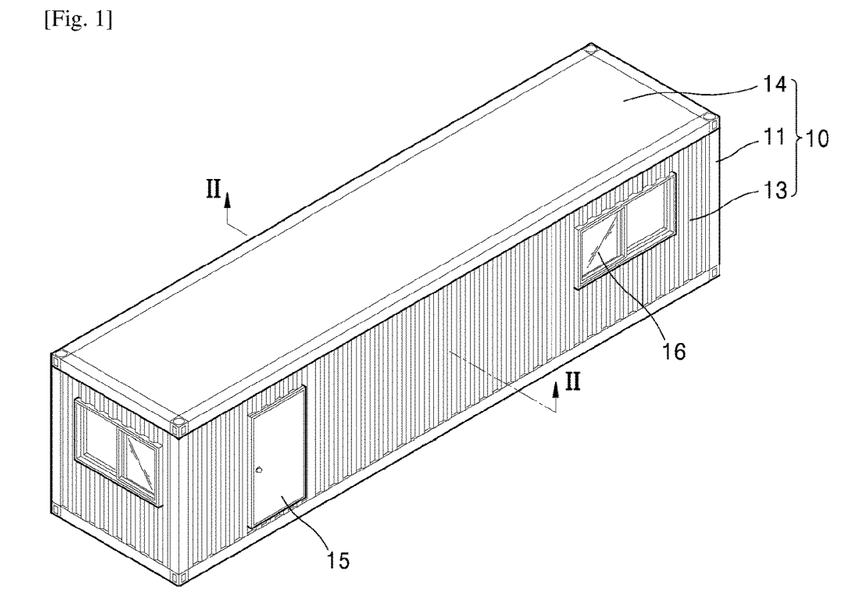
FIG. 1 is a perspective view of a container house having a reinforced insulation property according to a first preferred embodiment of the present invention.
Figure 2:
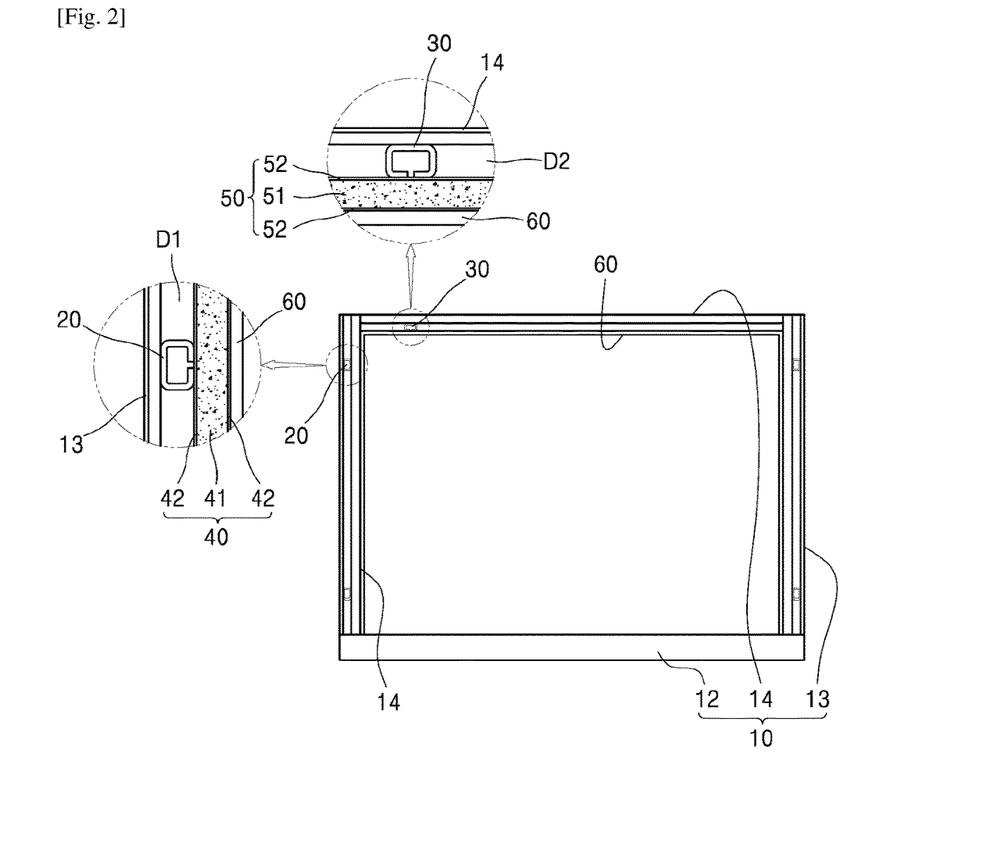
FIG. 2 is a sectional view taken along the line of II-II' of FIG. 1.

FIG. 1 is a perspective view of a container house having a reinforced insulation property according to a first preferred embodiment of the present invention, and FIG. 2 is a sectional view taken along the line of II-II' of FIG. 1.

As shown in the drawings, the container house according to the first preferred embodiment of the present invention includes: a plurality of first spacing members 20 welded to a side wall 13 inside a container body 10; a plurality of second spacing members 30 welded to a ceiling part (14) inside the container body 10; a plurality of first insulation panels 40 coupled to the first spacing members 20 so as to form a first interval space D1 between the first insulation panels and the side wall 13; a plurality of second insulation panels 50 coupled to the second spacing members 30 so as to form a second interval space D2 between the second insulation panels and the ceiling part 14; and a plurality of finishing panels 60 attached to the surfaces of the first and second insulation panels 40 and 50.

As shown in FIG. 1, the container body 10 includes: a frame assembly 11 which is assembled into a hexahedron; a floor part 12 combined to the frame assembly 11 to form a floor; a side wall 13 for forming a wall body surrounding the frame assembly 11; and a ceiling part 14 for forming a ceiling of the frame assembly 11. In this instance, the side wall 13 and the ceiling part 14 are wave-formed steel sheets having peaks and valleys or flat steel sheets. In the present embodiment, the side wall 13 is the wave-formed steel sheet and the ceiling part 14 is the flat steel sheet. A door frame 15 or a window frame 16 is mounted on the side wall 13.

The first spacing members 20 are bars made of a metal material, and is fixed to the side wall 13 by welding. Such first spacing members 20 fix the first insulation panels 40, and at the same time, form a first interval space D1 between the side wall 13 and the first insulation panels 40.

The first interval space D1 formed by the first spacing members 20 serves as an insulation layer to prevent outside heat of the container body 10 from being transferred to the first insulation panels 40. That is, an air layer is formed in the first interval space D1 as an insulation layer isolated from the first insulation panels 40. Moreover, the first interval space D1 provides a space where a plurality of electric wirings (not shown) for supplying electric power to various electronic units mounted on the container body 10 are mounted.

The second spacing members 30 are bars made of a metal material, and is fixed to the ceiling part 14 by welding. Such second spacing members 30 fix the second insulation panels 50, and at the same time, form a second interval space D2 between the ceiling part 14 and the second insulation panels 50.

The second interval space D2 formed by the second spacing members 30 serves as an insulation layer to prevent outside heat of the container body 10 from being transferred to the second insulation panels 50. That is, an air layer is formed in the second interval space D2 as an insulation layer isolated from the second insulation panels 50. Moreover, the second interval space D2 provides a space where a plurality of electric wirings (not shown) for supplying electric power to various electronic units mounted on the container body 10 are mounted.

Each of the first insulation panels 40 is a sandwich panel which is formed in such a way that a first iron plate 42 is attached to both sides of a first insulation material 41, and is spaced apart from the side wall 13 by the first spacing member 20. In this instance, the first insulation panel 40 maintains the condition that the electric wirings passing through the first interval space D1 are separated from the first insulation material 41 because the first iron plate 42 is attached to both sides of the first insulation material 41. Therefore, even though a spark is generated from the electric wiring due to electrical short, the spark is blocked by the first iron plate 42 so that it is prevented that the first insulation material 41 burns.

Each of the second insulation panels 50 is a sandwich panel which is formed in such a way that a second iron plate 52 is attached to both sides of a second insulation material 51, and is spaced apart from the ceiling part 14 by the second spacing member 30. In this instance, the second insulation panel 50 maintains the condition that the electric wirings passing through the second interval space D2 are separated from the second insulation material 51 because the second iron plate 52 is attached to both sides of the second insulation material 51. Therefore, even though a spark is generated from the electric wiring due to electrical short, the spark is blocked by the second iron plate 52 so that it is prevented that the second insulation material 51 burns.

Finishing panels 60 are attached onto the surfaces of the first and second insulation panels 40 and 50 for finishing, and may be plaster boards or veneers. Wallpaper or paint is applied to the finishing panels 60 in order to finish the interior of the container.

As described above, because the first and second insulation panels 40 and 50 are mounted to be space apart from the side wall 13 and the ceiling part 14 by the first and second spacing members 20 and 30, the first interval space D1 is formed between the side wall 13 and the first insulation panels 40 and the second interval space D2 is formed between the ceiling part 14 and the second insulation panel 50. Therefore, because the first and second interval spaces D1 and D2 which are filled with air become the first insulation layers and the first and second insulation panels 40 and 50 become the second insulation layers, the insulation layers are formed dually so as to maximize insulating effect and effectively prevent the outside heat of the container body 10 from being transferred to the inside of the container body 10.

Moreover, the first and second interval spaces D1 and D2 provide spaces for installing a plurality of electric wirings for supplying electric power to electronic units. Therefore, wiring work becomes easy because there is no need to form additional space for electric wirings.

Furthermore, because the first and the second panels 40 and 50 have the structure that both sides of the first and second insulation materials 41 and 51 are attached to the first and second iron plates 42 and 52, it is prevented that the electric wirings passing the first and second interval spaces D1 and D2 directly come into contact with the first and second insulation materials 41 and 51. Therefore, even though a spark is generated from the electric wiring due to electrical short, the spark is blocked by the first and second iron plates 42 and 52 so as to prevent that the first and second insulation materials 41 and 51 are burnt by the spark and prevent occurrence of fire.

Additionally, the first and second interval spaces D1 and D2 having the air layers can enhance soundproof property so as to prevent outside noise from being transferred to the inside of the container house.

Figure 3:
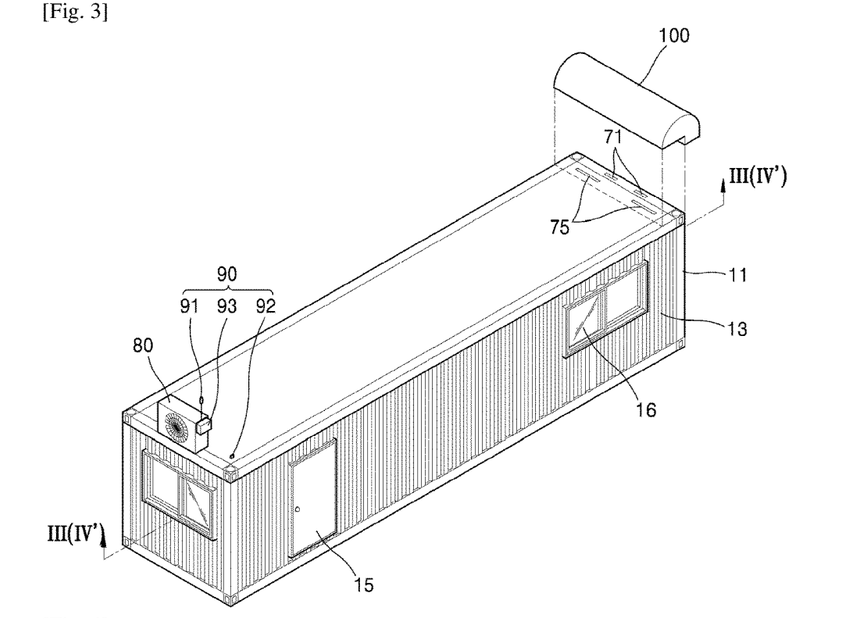
FIG. 3 is a perspective view of a container house having a reinforced insulation property according to a second preferred embodiment of the present invention.
Figure 4:
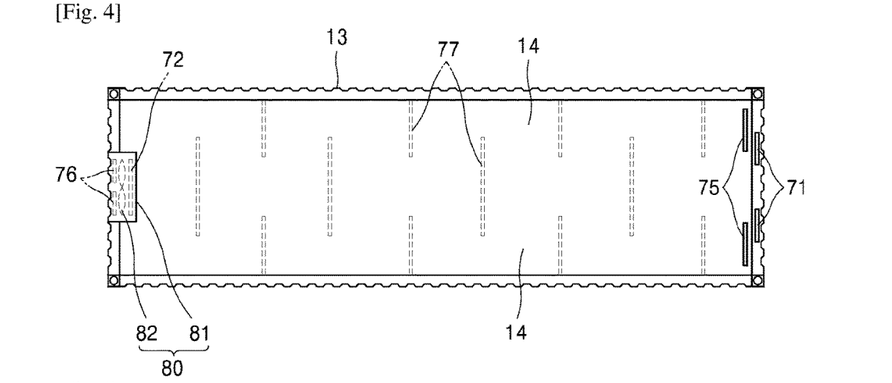
FIG. 4 is a view showing first and second inflow vent holes for inducing air into the container house of FIG. 3 and first and second outflow vent holes for discharging air.
Figure 5:
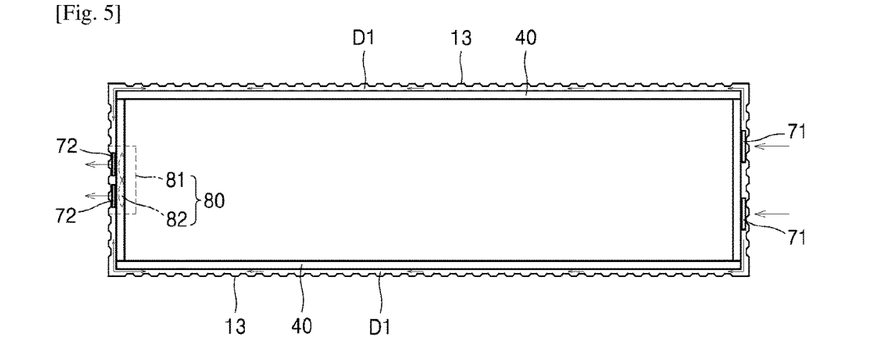
FIG. 5 is a view showing that the air induced through the first inflow vent hole of FIG. 4 passes through a first interval space between a side wall and a first insulation panel and is discharged out through the first outflow vent hole.
Figure 6:
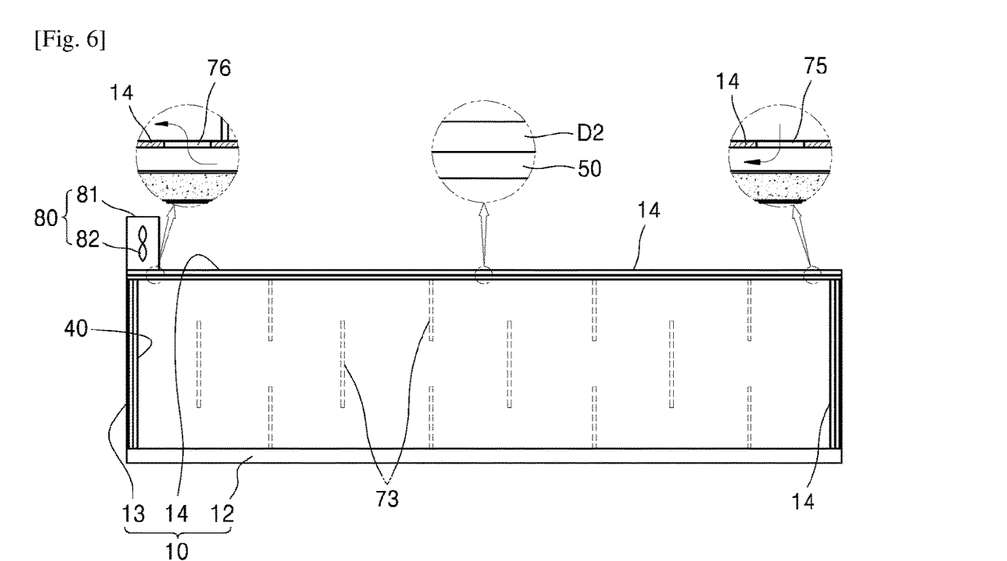
FIG. 6 is a view showing that the air induced through the second inflow vent hole of FIG. 4 passes through a second interval space between a ceiling part and a second insulation panel and is discharged out through the second outflow vent hole.
Figure 7:
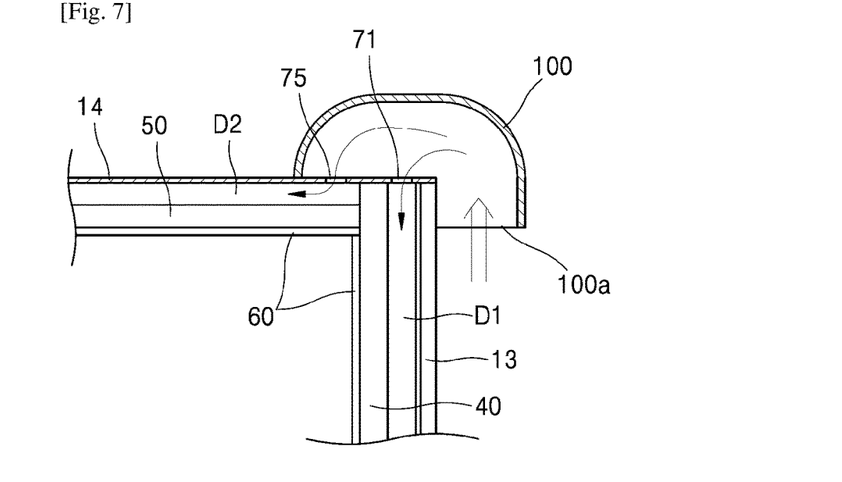
FIG. 7 is a view showing a roof cover for preventing rain or snow from being induced into the first inflow vent hole and the second inflow vent hole in FIG. 3.

FIG. 3 is a perspective view of a container house having a reinforced insulation property according to a second preferred embodiment of the present invention, FIG. 4 is a view showing first and second inflow vent holes for inducing air into the container house of FIG. 3 and first and second outflow vent holes for discharging air, FIG. 5 is a view showing that the air induced through the first inflow vent hole of FIG. 4 passes through a first interval space between a side wall and a first insulation panel and is discharged out through the first outflow vent hole, FIG. 6 is a view showing that the air induced through the second inflow vent hole of FIG. 4 passes through a second interval space between a ceiling part and a second insulation panel and is discharged out through the second outflow vent hole, and FIG. 7 is a view showing a roof cover for preventing rain or snow from being induced into the first inflow vent hole and the second inflow vent hole in FIG. 3. Here, the same reference numerals as FIGS. 1 and 2 designate the same components or members having the same functions.

As shown in the drawings, the container house according to the second preferred embodiment of the present invention has similar structure to the first preferred embodiment of the present invention. The container house according to the second preferred embodiment includes: first and second spacing members 20 and 30; first and second insulation panels 40 and 50; finishing panels 60; a first inflow vent hole 71 and a first outflow vent hole 72 which are respectively formed at one side and the other side of an upper part of the container body 10 to communicate with the first interval space D1; a second inflow vent hole 75 and a second outflow vent hole 76 which are respectively formed at one side and the other side of an upper part of the container body 10 to communicate with the second interval space D2; a fan unit 80 communicating with the first outflow vent hole 72 and the second outflow vent hole 76 to form a negative pressure in the first and second interval spaces D1 and D2; a fan controller 90 for automatically operating the fan unit 80 when a temperature difference between temperature of outdoor air and temperature of at least one of the side wall 13 and the ceiling part 14 is over a preset temperature difference; and a roof cover 100 for preventing rain or snow from entering the first inflow vent hole 71 and the second inflow vent hole 75.

As shown in FIG. 5, the first inflow vent hole 71 and the first outflow vent hole 72 communicate with the first interval space D1 and form a passage to induce and discharge air to one side and the other side of the side wall 13.

As shown in FIG. 6, the second inflow vent hole 75 and the second outflow vent hole 76 communicate with the second interval space D2 and form a passage to induce and discharge air to one side and the other side of the ceiling part 14.

In this embodiment, for convenience in description, it is described that the first interval space D1 and the second interval space D2 are independent from each other, but of course, the first and second interval spaces D1 and D2 may communicate with each other.

The fan unit 80 communicates with the first outflow vent hole 72 and/or the second outflow vent hole 76 to form a negative pressure in the first and second interval spaces D1 and D2 so that outdoor air is induced into the first and second inflow vent holes 71 and 75. For this, as shown in FIGS. 4 to 6, the fan unit 80 includes: a fan housing 81 surrounding the first and second outflow vent holes 72 and 76; and a fan 82 which is mounted in the fan housing 81 to discharge the inside air of the fan housing 81 to the outside.

In this embodiment, it is described that the fan unit 80 is one which is simultaneously communicated with the first outflow vent hole 72 and the second outflow vent hole 76. However, of course, independent fan units 80 may be respectively communicated with the first outflow vent hole 72 and the second outflow vent hole 76. That is, the fan unit 80 may include: the fan housing 81 surrounding the first outflow vent hole 72; and the fan 82 which is mounted in the fan housing 81 to discharge the inside air of the fan housing 81 to the outside. Alternatively, the fan unit 80 may include: the fan housing 81 surrounding the second outflow vent hole 76; and the fan 82 which is mounted in the fan housing 81 to discharge the inside air of the fan housing 81 to the outside.

Because the first interval space D1 is formed between the side wall 13 and the first insulation panels 40, when the fan unit 80 is operated, as shown in FIG. 5, the outside air is discharged out through the first inflow vent hole 71, the first interval space D1 and the first outflow vent hole 72. In this process, because the outside air absorbs heat of the side wall 13 and the first insulation panels 40, even though temperature of the side wall 13 rises over 70 to 80° C., it is minimized that the high heat is transferred to the first insulation panels 40.

In this instance, as shown in FIG. 6, inside the first interval space D1, a plurality of first vortex forming members 73 are formed in zigzags so that the air passing the first interval space D1 can flow in contact with the whole surface of the side wall 13. Therefore, as shown in FIG. 5, the air flowing the first interval space D1 after being induced into the first inflow vent hole 71 flows in contact with the whole surface of the side wall 13 while forming vortex by colliding against the first vortex forming members 73. Therefore, the air is discharged after absorbing heat to the side wall 13 more effectively, so that it is minimized that heat is transferred to the first insulation panels 40 through the side wall 13.

Because the second interval space D2 is formed between the ceiling part 14 and the second insulation panels 50, when the fan unit 80 is operated, as shown in FIG. 6, the outside air is discharged out through the second inflow vent hole 75, the second interval space D2 and the second outflow vent hole 76. In this process, because the outside air absorbs heat of the ceiling part 14 and the second insulation panels 50, even though temperature of the ceiling part 14 rises over 70 to 80° C., it is minimized that the high heat is transferred to the second insulation panels 50.

In this instance, as shown in FIG. 4, inside the second interval space D2, a plurality of second vortex forming members 777 are formed in zigzags so that the air passing the second interval space D2 can flow in contact with the whole surface of the ceiling part 14. Therefore, as shown in FIG. 6, the air flowing the second interval space D2 after being induced into the second inflow vent hole 75 flows in contact with the whole surface of the ceiling part 14 while forming vortex by colliding against the second vortex forming members 77. Therefore, the air is discharged after absorbing heat to the ceiling part 14 more effectively, so that it is minimized that heat is transferred to the second insulation panels 50 through the ceiling part 14.

The fan controller 90 includes: a first temperature sensor 91 for generating a first temperature signal S1 corresponding to temperature of outdoor air measured; a second temperature sensor 92 for generating a second temperature signal S2 corresponding to inside temperature of at least one of the side wall 13 and the ceiling part 14 measured; and a fan operating part 93 for operating the fan unit 80 when a temperature difference measured by the first temperature signal S1 and the second temperature signal S2 is over a preset temperature difference.

For instance, if temperature of the outdoor air reaches 30° C., because temperature of the ceiling part 14 of the container body rises over 70 to 80° C., inside temperatures of the first and second interval spaces D1 and D2 also rise to 70 to 80° C. In this instance, high heat is transferred to the first and second insulation panels 40 and 50, and the inside temperature of the container house also rises sharply.

However, due to the fan controller 90, if difference between temperature of the outdoor air measured by the first temperature sensor 91 and temperature of the side wall 13 or the ceiling part 14 measured by the second temperature sensor 92 is over the preset temperature difference, namely, over 10° C., the fan operating part 93 operates the fan 82 of the fan unit. Then, a negative pressure is formed at the first and second outflow vent holes 72 and 76, and outside air is induced into the first and second inflow vent holes 71 and 75. Such air passes the first and second interval spaces D1 and D2, and then, is discharged out through the first and second outflow vent holes 72 and 76 and the fan 80. In this instance, the outside air absorbs temperature of the side wall 13 and the ceiling part 14 and discharges the air heated in the first and second interval spaces D1 and D2, so that heat transferred to the first and second insulation panels 40 and 50 is minimized. Finally, insulation effect is maximized, and it prevents the inside temperature of the container house from rising sharply.

As shown in FIG. 7, the roof cover 100 is mounted at a predetermined portion of the container body 10 to prevent rain or snow from being induced into the first inflow vent hole 71 and the second inflow vent hole 75. Such a roof cover 100 surrounds the first inflow vent hole 71 and/or the second inflow vent hole 75 to prevent rain or snow from being induced into the first and second inflow vent holes 71 and 75, and has a cover entrance 100a formed below the first and second inflow vent holes 71 and 75 to induce air. Therefore, the roof cover prevents rain or snow from being induced into the first and second inflow vent holes 71 and 75 but the air is induced into the first and second inflow vent holes 71 and 75 through the cover entrance 100a.

As described above, in the container house having the reinforced insulation property according to the second preferred embodiment of the present invention, if outdoor air rises up and the side wall 13 and the ceiling part 14 are heated excessively, the fan controller 90 operates the fan 80 to forcedly induce air into the first and second inflow vent holes 71 and 75. The forcedly induced air passes the first and second interval spaces D1 and D2, and then, is discharged to the first and second outflow vent holes 72 and 76. In this process, the air passing the first and second interval spaces D1 and D2 forms vortex by colliding against the first and second vortex forming members 73 and 77 and effectively absorbs heat transferred to the side wall and the ceiling part 14 while coming into contact with the whole surfaces of the side wall 13 and the ceiling part 14, and then, is discharged out. Therefore, the present invention can minimize that heat is transferred to the first and second insulation panels 40 and 50 through the side wall 13 and the ceiling part 14.

Additionally, because the inside temperature of the first and second interval spaces D1 and D2 lowers, the present invention can prevent that the insulation layers of the electric wirings mounted in the first and second interval spaces D1 and D2 are damaged or rapidly hardened by high heat.

While the present invention has been particularly shown and described with reference to exemplary embodiments thereof, it will be understood by those of ordinary skill in the art that various changes or equivalents in form and details may be made therein without departing from the spirit and scope of the present invention as defined by the following claims.

According to the preferred embodiments of the present invention, the container house having the reinforced insulation property can maximize insulating effect because the first and second insulation panels 40 and 50 are mounted on the side wall 13 and the ceiling part 14 to form the first and second interval spaces D1 and D2 having the air layers, and can maintain a pleasant environment in summer or winter. Particularly, if outdoor air rises up and the side wall 13 and the ceiling part 14 are heated excessively, the fan controller 90 automatically operates the fan 80 to absorb heat of the side wall 13 and the ceiling part 14 and discharge the absorbed heat. Therefore, the present invention can minimize that heat is transferred to the first and second insulation panels 40 and 50 through the side wall 13 and the ceiling part 14 to maximize insulation effect more.

Moreover, because the first and second interval spaces D1 and D2 are formed, the container house having the reinforced insulation property is easy to assemble because it does not need a space for installing electric wirings, and can prevent fire from breaking out even though a spark is set off by electrical short.

Furthermore, the container house having the reinforced insulation property can prevent damage of the insulation layers surrounding the electric wirings or acceleration of hardening because high heat is not transferred to the electric wirings even though temperature of the side wall and the ceiling part of the container house rises up to 70 to 80° C. in the middle of summer.

Additionally, the container house having the reinforced insulation property can enhance soundproof property so that outside noise is not induced into the container house due to the first and second interval spaces D1 and D2 having the air layers.

The invention claimed is:

1. A container house having a reinforced insulation property, comprising:
 a plurality of first space members (20) attached to a side wall (13) of a container body (10);

a plurality of second spacing members (30) attached to a top (14) of the container body (10);
plurality of first insulation panels (40) coupled to the first spacing members (20) forming a first interval space (D1) between the first insulation panels and the side wall (13);
a plurality of second insulation panels (50) coupled to the second spacing members (30) forming a second interval space (D2) between the second insulation panels and the top (14); and
a plurality of finishing panels (60) attached to the first and second insulation panels (40, 50);
a first inflow vent hole (71) and a first outflow vent hole (72) which are respectively formed in one side and in another side of the top of the container body (10) to communicate with the first interval space (D1);
a fan unit (80) communicating with the first outflow vent hole (72) to form a negative pressure in the first interval space (D1);
a first temperature sensor (91) for generating a first temperature signal (S1) corresponding to a measured outdoor temperature;
a second temperature sensor (92) for generating a second temperature signal (S2) corresponding to a measured inside temperature of at least one of the side wall (13) and the top of the container body; and
a fan operating part (93) for operating the fan unit (80) when a temperature difference using the first temperature signal (51) and the second temperature signal (S2) is larger than a preset value.

2. The container house according to claim 1, wherein the first and second insulation panels (40, 50) comprise sandwich with each sandwich panel including a first and a second iron plates (42, 52) attached, respectively, to both sides of first and second insulation materials (41, 51); and
wherein the first and second insulation materials comprise Styrofoam to prevent generation of a fire by a spark generated from electric wirings passing through the first and second interval spaces (D1, D2).

3. The container house according to claim 1, further comprising:
a second inflow vent hole (75) and a second outflow vent hole (76) which are respectively formed in one side and in the another side of the container body (10) to communicate with the second interval space (D2).

4. The container house according to claim 1, wherein the fan unit (80) comprises:
a fan housing (81) surrounding a first outflow vent hole (72) or the second outflow vent hole (76); and
a fan (82) which is mounted in the fan housing (81) to discharge the inside air of the fan housing (81) to the outside.

5. The container house according to claim 1, further comprising:
a plurality of first vortex members (73) forming a vortex inside the first interval space (D1).

6. The container house according to claim 1, further comprising:
a plurality of second vortex members (77) forming a vortex inside the second interval space (D2).

7. The container house according to claim 1, further comprising:
a roof cover (100) covering the first inflow vent hole (71) to prevent rain or snow from being induced into the first inflow vent hole (71); and
the roof cover (100) including a cover entrance (100a) formed below the first and inflow vent hole (71) to induce air.

8. The container house according to claim 3, further comprising:
a roof cover (100) covering the second inflow vent hole (75) to prevent rain or snow from being induced into the second inflow vent hole (75); and
the roof cover (100) including a cover entrance (100a) formed below the second inflow vent holes (75) to induce air.

9. An insulated container house having at least four walls and a ceiling, comprising:
at least a spacing member for maintaining an interval wall space between each of insides of the four walls and each of the one or more insulation panels respectively substantially covering each of the insides of the four walls;
at least a spacing member for maintaining an interval ceiling space between inside of the ceiling and each of the one or more insulation panels respectively substantially covering the inside of the ceiling;
the interval wall space and the interval ceiling space being connected;
an inflow vent hole and an outflow vent hole respectively formed at opposite top ends of the container house and connected to either the interval wall space or the interval ceiling space or both;
a fan communicating with the outflow vent hole to form a negative pressure in the interval wall space and the interval ceiling space when the fan is operated;
a first temperature sensor for generating a first temperature signal (S1) corresponding to a measured outdoor temperature;
a second temperature sensor for generating a second temperature signal (S2) corresponding to a measured inside temperature of at least one of the side wall and the ceiling of the container house;
a fan operating part for operating the fan when a temperature difference using the first temperature signal (S1) and the second temperature signal (S2) is larger than a preset value,
whereby the inside of the insulated container house is cooled when the fan is operated to form the negative pressure in the interval wall spaces and the interval ceiling space.

10. The insulated container house of claim 9, wherein each spacing member maintains respectively the interval wall spaces and the interval ceiling space by being connected to the inside of one of the four walls or the inside of the ceiling and to the one or more insulation panels substantially covering the inside of the one of the four walls or the inside of the ceiling.

11. The insulated container house of claim 9, wherein one or more of the spacing members maintaining respectively the interval walls spaces and the interval ceiling space comprises a vortex member for forming, respectively, a vortex inside each of the interval wall spaces and the interval ceiling space.

12. The insulated container house of claim 9, wherein each of the one or more spacing members is substantially rectangular in shape, and wherein each of the one or more spacings members is connected on one of its long sides to one of the four walls or the ceiling.

13. An insulated container house having at least four walls and a ceiling, comprising:

each of the four walls covered along its inside height and width respectively by one or more insulation panels that are set apart from each of the four walls by an interval wall space having a width between a wall and each of its one or more insulation panels that is defined by width of at least one wall spacing element disposed between the wall and one of its one or more insulation panels;

the ceiling covered on its inside by an additional one or more insulation panels that are set apart from the inside of the ceiling by an interval ceiling space having a width between the ceiling and the additional one or more insulation panels that is defined by width of at least one ceiling spacing element disposed between the ceiling and one of its one or more insulation panels;

an inflow vent hole and an outflow vent hole respectively formed at opposite ends of the container house and connected to the interval wall space and the interval ceiling space;

a fan communicating with the outflow vent hole to form a negative pressure in the interval wall space and the interval ceiling space when the fan is operated;

an outside temperature sensor for generating a first temperature signal (S1) corresponding to a measured outdoor temperature;

an inside temperature sensor for generating a second temperature signal (S2) corresponding to a measured inside temperature of at least one of the side wall and the ceiling of the container house;

a fan operating part for operating the fan when a temperature difference using the first temperature signal (S1) and the second temperature signal (S2) is larger than a preset value, whereby the inside of the insulated container house is cooled when the fan is operated to form the negative pressure in the interval wall spaces and the interval ceiling space.

14. The insulated container house of claim 13, wherein the at least one wall spacing element is generally rectangular in shape and wherein the width of the at least one wall spacing element defining the width of the interval wall space is the distance between outer long sides of the at least one wall spacing element.

15. The insulated container house of claim 14, wherein the generally rectangular shaped at least one wall spacing element is hollow.

16. The insulated container house of claim 14, wherein the generally rectangular shaped at least one wall spacing element is generally shaped as a rectangular "C" with long side of the wall spacing element including the open part of the "C" shaped being attached to the one or more insulation panels.

17. The insulated container house of claim 13, wherein the at least one wall spacing element is made of metal.

* * * * *